United States Patent
Sugiyama et al.

(10) Patent No.: US 10,875,964 B2
(45) Date of Patent: Dec. 29, 2020

(54) POLYMERIC BINDER OF POLYACRYLIC ACID, POLYFUNCTIONAL AMINE, AND LINKING BENZENE RING

(71) Applicant: KABUSHIKI KAISHA TOYOTA JIDOSHOKKI, Kariya (JP)

(72) Inventors: Yusuke Sugiyama, Kariya (JP); Takeshi Kondo, Kariya (JP); Nobuhiro Goda, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 228 days.

(21) Appl. No.: 16/094,029

(22) PCT Filed: Mar. 27, 2017

(86) PCT No.: PCT/JP2017/012436
§ 371 (c)(1),
(2) Date: Oct. 16, 2018

(87) PCT Pub. No.: WO2017/183398
PCT Pub. Date: Oct. 26, 2017

(65) Prior Publication Data
US 2019/0119448 A1 Apr. 25, 2019

(30) Foreign Application Priority Data
Apr. 21, 2016 (JP) .................. 2016-085253

(51) Int. Cl.
| | | |
|---|---|---|
| C08G 73/06 | (2006.01) |
| H01G 11/38 | (2013.01) |
| C08F 8/48 | (2006.01) |
| H01M 4/133 | (2010.01) |
| H01M 4/04 | (2006.01) |
| H01M 4/134 | (2010.01) |
| C08F 8/32 | (2006.01) |
| C08J 3/24 | (2006.01) |
| H01M 4/38 | (2006.01) |
| H01M 4/62 | (2006.01) |
| H01M 4/02 | (2006.01) |

(52) U.S. Cl.
CPC ............ *C08G 73/0677* (2013.01); *C08F 8/32* (2013.01); *C08F 8/48* (2013.01); *C08J 3/24* (2013.01); *H01G 11/38* (2013.01); *H01M 4/0404* (2013.01); *H01M 4/0471* (2013.01); *H01M 4/133* (2013.01); *H01M 4/134* (2013.01); *H01M 4/382* (2013.01); *H01M 4/622* (2013.01); *C08F 2810/20* (2013.01); *H01M 2004/027* (2013.01)

(58) Field of Classification Search
CPC ...... H01M 4/622; H01M 4/621; H01M 4/382; H01M 4/0404; H01M 4/134; H01M 4/0471; H01M 4/133; H01M 2004/027; C08G 73/0677; C08J 3/24; H01G 11/38; C08F 8/48; C08F 8/32; C08F 2810/20
See application file for complete search history.

(56) References Cited

U.S. PATENT DOCUMENTS

| | | | | |
|---|---|---|---|---|
| 6,991,874 | B1 * | 1/2006 | Mohwald | ........... G01N 27/4073 |
| | | | | 429/129 |
| 8,702,924 | B2 * | 4/2014 | Hua | ........... C08K 3/041 |
| | | | | 204/403.01 |
| 2009/0136845 | A1 | 5/2009 | Choi et al. | |
| 2011/0152467 | A1 | 6/2011 | Chaudhary et al. | |
| 2016/0233511 | A1 * | 8/2016 | Kim | ........... H01M 4/134 |

FOREIGN PATENT DOCUMENTS

| | | |
|---|---|---|
| JP | 2003-003031 A | 1/2003 |
| JP | 2009-080971 A | 4/2009 |
| JP | 2009-135103 A | 6/2009 |
| JP | 2012-500891 A | 1/2012 |
| WO | 2016/063882 A1 | 4/2016 |

OTHER PUBLICATIONS

"Poly(acrylic acid) blend with poly(benzimidazole) as a novel binder for Si negative electrode in Li-ion battery". CHERIC (2014).*
"Poly(acrylic acid) containing multi-benzimidazole units: A simple approach to obtain polymer with proton donor-acceptor system". Pangon et al. Polymer 53 (2012) 3878-3884.*
International Search Report of PCT/JP2017/012436 dated Apr. 25, 2017.

* cited by examiner

*Primary Examiner* — Stephen J Yanchuk
(74) *Attorney, Agent, or Firm* — Sughrue Mion, PLLC

(57) ABSTRACT

A polymer compound to be used as a binder for a negative electrode of a power storage device is provided. The polymer compound is formed by condensation of a polyacrylic acid and a polyfunctional amine represented by the following general formula (1), where X is a ring structure having 1 to 3 benzene rings; and $C^1$ to $C^4$ are each a carbon atom constituting a benzene ring in the ring structure.

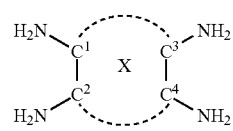

(1)

8 Claims, No Drawings

POLYMERIC BINDER OF POLYACRYLIC ACID, POLYFUNCTIONAL AMINE, AND LINKING BENZENE RING

CROSS REFERENCE TO RELATED APPLICATIONS

This application is a National Stage of International Application No. PCT/JP2017/012436 filed Mar. 27, 2017, claiming priority based on Japanese Patent Application No. 2016-085253 filed Apr. 21, 2016.

TECHNICAL FIELD

The present invention relates to a polymer compound to be used as a binder for a negative electrode of a power storage device, an intermediate composition of the polymer compound, a negative electrode, a power storage device, and a method for producing the polymer compound.

BACKGROUND ART

As products using rechargeable batteries, mobile devices, such as mobile phones and notebook computers, are widely used. Rechargeable batteries are also attracting attention as large power sources for electric vehicles.

An electrode of a rechargeable battery is constituted of, for example, a current collector made of a metal material, such as copper or aluminum, and an active substance layer bonded onto the current collector. In general, the active substance layer contains an electrode binder for bonding the active substance to the current collector. In recent years, it has been tried to use a polyacrylic acid, which is an inexpensive polymer compound, as a binder for an electrode. Patent Document 1 discloses electrode binders containing lithium polyacrylate or sodium polyacrylate. Patent Document 2 discloses an electrode binder containing a polyacrylic acid and a polyethyleneimine. Patent Document 3 discloses an electrode binder containing a polyacrylic acid and an amine compound.

PRIOR ART DOCUMENTS

Patent Documents

Patent Document 1: Japanese Laid-Open Patent Publication No. 2009-080971
Patent Document 2: Japanese Laid-Open Patent Publication No. 2009-135103
Patent Document 3: Japanese Laid-Open Patent Publication No. 2003-003031

SUMMARY OF THE INVENTION

Problems that the Invention is to Solve

The present researchers have found that a polymer compound formed by condensation of a polyacrylic acid and a polyfunctional amine having a specific molecular structure is useful as a binder for a negative electrode of a power storage device, such as a rechargeable battery. An objective of the present invention is to provide a polymer compound useful as a binder for a negative electrode of a power storage device, an intermediate composition for preparing the polymer compound, a negative electrode using the polymer compound as a binder for a negative electrode, and a power storage device. In addition, an objective of the present invention is to provide a method for producing the polymer compound.

Means for Solving the Problems

To achieve the foregoing objective and in accordance with a first aspect of the present invention, a polymer compound to be used as a binder for a negative electrode of a power storage device is provided. The polymer compound is formed by condensation of a polyacrylic acid and a polyfunctional amine represented by the following general formula (1), where X is a ring structure having 1 to 3 benzene rings, and $C^1$ to $C^4$ are each a carbon atom constituting a benzene ring in the ring structure.

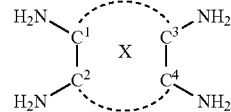

(1)

To achieve the foregoing objective and in accordance with a second aspect of the present invention, a polymer compound to be used as a binder for a negative electrode of a power storage device is provided. The polymer compound comprises a chain structure constituted of a polyacrylic acid and a crosslinked structure connecting carboxylic acid side chains in the chain structure or between the chain structures. The crosslinked structure is a crosslinked structure represented in the following general formula (6), where PAA is a chain structure constituted of a polyacrylic acid, X is a ring structure having 1 to 3 benzene rings, and $C^1$ to $C^4$ are each a carbon atom constituting a benzene ring in the ring structure.

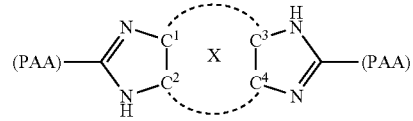

(6)

To achieve the foregoing objective and in accordance with a third aspect of the present invention, an intermediate composition of a polymer compound to be used as a binder for a negative electrode of a power storage device is provided. The intermediate composition includes a polyacrylic acid, a solvent, and a polyfunctional amine represented by the following general formula (1), where X is a ring structure having 1 to 3 benzene rings, and $C^1$ to $C^4$ are each a carbon atom constituting a benzene ring in the ring structure.

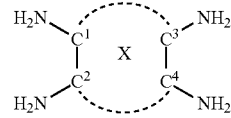

(1)

To achieve the foregoing objective and in accordance with a fourth aspect of the present invention, a method for producing the above-described polymer compound is provided. The method includes condensing a polyacrylic acid and a polyfunctional amine represented by the following general formula (1), where X is a ring structure having 1 to 3 benzene rings, and $C^1$ to $C^4$ are each a carbon atom constituting a benzene ring in the ring structure

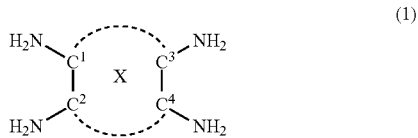

(1)

To achieve the foregoing objective and in accordance with a fifth aspect of the present invention, a negative electrode for a power storage device is provided that includes a binder for a negative electrode containing the above-described polymer compound and a negative electrode active substance. The negative electrode active substance is at least one selected from a carbon substance capable of occluding and releasing lithium, an element that can be alloyed with lithium, and a compound containing an element that can be alloyed with lithium.

To achieve the foregoing objective and in accordance with a sixth aspect of the present invention, a power storage device including the above-described negative electrode and a nonaqueous electrolyte is provided.

MODES FOR CARRYING OUT THE INVENTION

Embodiments of the present invention will be described in detail below.

[Polymer Compound]

The polymer compound of the present embodiment is a compound formed by condensation of a polyacrylic acid (A) and a polyfunctional amine (B).

The polyacrylic acid (A) is a homopolymer of acrylic acid. The weight-average molecular weight of the polyacrylic acid is not particularly limited and is, for example, preferably within the range of 10,000 to 2,000,000, more preferably within the range of 25,000 to 1,800,000, and further preferably within the range of 50,000 to 1,500,000.

When a conventional polymer compound, such as polyamideimide, is used as a binder for a negative electrode, the cycle property of the power storage device tends to decrease as the weight-average molecular weight of the polymer compound decreases. In contrast, when the polymer compound of the present embodiment is used as a binder for a negative electrode, the cycle property of the power storage device is maintained even if the weight-average molecular weight of the polyacrylic acid constituting the polymer compound decreases. Accordingly, a polyacrylic acid having a low molecular weight of, for example, 250,000 or less or 100,000 or less is suitably used as the polyacrylic acid (A).

The polyfunctional amine (B) is a compound having a structure represented by the following general formula (1):

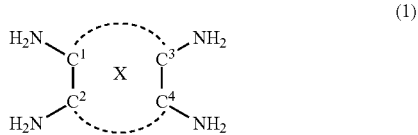

(1)

It is characterized that in the general formula (1), X is a ring structure having 1 to 3 benzene rings, and $C^1$ to $C^4$ are each a carbon atom constituting a benzene ring in the ring structure.

An example of the above-mentioned ring structure is a ring structure represented by the following general formula (2):

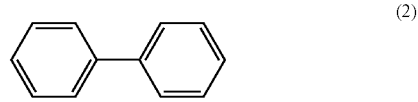

(2)

The ring structure represented by the general formula (2) is a polycyclic ring structure in which two benzene rings are linked. In the ring structure represented by the general formula (2), the benzene ring having $C^4$ and $C^2$ as components is preferably different from the benzene ring having $C^3$ and $C^4$ as components, although the positions of $C^4$ and $C^2$ and the positions of $C^3$ and $C^4$ in each benzene ring are not particularly limited. In addition, a substituent may be bonded to a carbon atom constituting each benzene ring, in addition to the four amino groups bonded to $C^4$ to $C^4$.

Specific examples of the polyfunctional amine (B) having a ring structure represented by the general formula (2) include 3,3',4,4'-tetraaminobiphenyl(3,3'-diaminobenzidine), 2,2',3,3'-tetraaminobiphenyl, and 2,3,3',4'-tetraaminobiphenyl.

Another example of the above-mentioned ring structure is a ring structure represented by the following general formula (3):

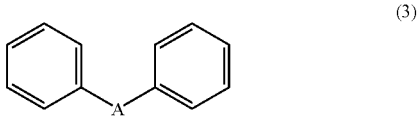

(3)

In the ring structure represented by the general formula (3), A is a methylene group or an oxygen atom.

The ring structure represented by the general formula (3) is a polycyclic ring structure in which two benzene rings are linked by a methylene group or an oxygen atom. In the ring structure represented by the general formula (3), the benzene ring having $C^4$ and $C^2$ as components is preferably different from the benzene ring having $C^3$ and $C^4$ as components, although the positions of $C^1$ and $C^2$ and the positions of $C^3$ and $C^4$ in each benzene ring are not particularly limited. In addition, a substituent may be bonded to a carbon atom constituting each benzene ring, in addition to the four amino groups bonded to $C^1$ to $C^4$.

Specific examples of the polyfunctional amine (B) having a ring structure represented by the general formula (3) where A is a methylene group include 3,3',4,4'-tetraaminodiphenylmethane, 2,2',3,3'-tetraaminodiphenylmethane, and 2,3,3',4'-tetraaminodiphenylmethane.

Specific examples of the polyfunctional amine (B) having a ring structure represented by the general formula (3) where A is an oxygen atom include 3,3',4,4'-tetraaminodiphenyl ether, 2,2',3,3'-tetraaminodiphenyl ether, and 2,3,3',4'-tetraaminodiphenyl ether.

An example of the above-mentioned ring structure is represented by the following general formula (4):

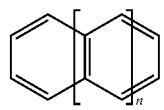

(4)

In the ring structure represented by the general formula (4), n is 0, 1, or 2.

The ring structure represented by the general formula (4) is a monocyclic ring structure (n=0) consisting of one benzene ring or a polycyclic ring structure (n=1 to 2) formed by condensation of two or three benzene rings. In the ring structure represented by the general formula (3), the positions of $C^1$ and $C^2$ and the positions of $C^3$ and $C^4$ in each benzene ring are not particularly limited. In addition, a substituent may be bonded to a carbon atom constituting each benzene ring, in addition to the four amino groups bonded to $C^1$ to $C^4$.

In addition, in the ring structure represented by the general formula (4), n is preferably 1 or 2. In this case, the benzene ring having $C^1$ and $C^2$ as components is preferably different from the benzene ring having $C^3$ and $C^4$ as components.

Specific examples of the polyfunctional amine (B) having a ring structure represented by the general formula (4) where n is 0 include 1,2,4,5-tetraaminobenzene and 1,2,3,4-tetraaminobenzene.

Specific examples of the polyfunctional amine (B) having a ring structure represented by the general formula (4) where n is 1 include 1,2,7,8-tetraaminonaphthalene, 1,2,5,6-tetraaminonaphthalene, 1,2,6,7-tetraaminonaphthalene, and 2,3,6,7-tetraaminonaphthalene.

Specific examples of the polyfunctional amine (B) having a ring structure represented by the general formula (4) where n is 2 include 1,2,7,8-tetraaminoanthracene, 1,2,5,6-tetraaminoanthracene, 1,2,6,7-tetraaminoanthracene, and 2,3,6,7-tetraaminoanthracene.

Furthermore, the polyfunctional amines (B) may be used singly or in combination of two or more thereof.

The blend proportion of the polyfunctional amine (B) is set according to the number of carboxyl groups possessed by the polyacrylic acid (A). The blend proportion of the polyfunctional amine (B) is such that the molar ratio of the polyfunctional amine (B) to the carboxyl group possessed by the polyacrylic acid (A) is preferably 1/20 to 1/1, more preferably 1/10 to 1/1, and further preferably 1/10 to 1/2.

The polymer compound of the present embodiment is obtained through a mixing step of mixing the polyacrylic acid (A) and the polyfunctional amine (B) in a solvent and a heating step of heat-treating the intermediate composition obtained in the mixing step.

The mixing step is a step of obtaining a liquid intermediate composition in which the polyacrylic acid (A), the polyfunctional amine (B), and a solvent are mixed. As the solvent used in the mixing step, a solvent that can dissolve the polyacrylic acid (A) and the polyfunctional amine (B) can be selected as necessary. In particular, from the viewpoint of improving solubility, it is preferable to use a nonaqueous solvent, such as N-methyl-2-pyrrolidone, dimethylformamide, dimethylacetamide, dimethyl sulfoxide, propylene carbonate, γ-butyrolactone, ethanol, and propanol.

The heating step is a step of heat-treating the intermediate composition to condense the polyacrylic acid (A) and the polyfunctional amine (B) contained in the intermediate composition. The heating temperature in the heating step is preferably within the range of 150° C. to 230° C. and more preferably within the range of 180° C. to 200° C., from the viewpoint of accelerating the formation of a crosslinked structure.

In addition, in order to accelerate the formation of a crosslinked structure by a condensation reaction of the polyacrylic acid (A) and the polyfunctional amine (B), a dehydration condensation agent may be added to the intermediate composition. Examples of the dehydration condensation agent include phosphorus oxychloride.

The intermediate composition subjected to the heating step is preferably a preheat-treated intermediate composition. The temperature of the preheat treatment is preferably within the range of 40° C. to 140° C. and preferably within the range of 60° C. to 130° C. By performing the preheat treatment, the polyacrylic acid (A) and the polyfunctional amine (B) contained in the intermediate composition associate to form a state in which the condensation reaction of a carboxyl group and an amino group readily proceeds. As a result, it is possible to allow the condensation reaction to proceed efficiently in the heating step. The condensation reaction of a carboxyl group and an amino group may partially proceed by the preheat treatment. In addition, in the case of using the preheat-treated intermediate composition, the heating step is preferably performed in a state in which the solvent contained in the intermediate composition has been removed. In this case, the condensation reaction between the polyacrylic acid (A) and the polyfunctional amine (B) readily proceeds.

A polymer compound formed by condensation of the polyacrylic acid (A) and the polyfunctional amine (B) can be obtained through the heating step. This polymer compound is thought to have a structure in which polyacrylic acids are crosslinked via formation of a benzimidazole-like bonding structure by a dehydration condensation reaction between the carboxyl group of the polyacrylic acid (A) and the two amino groups bonded to $C^1$ and $C^2$ in the polyfunctional amine (B) and between the carboxyl group of the polyacrylic acid (A) and the two amino groups bonded to $C^3$ and $C^4$ in the polyfunctional amine (B). That is, the polymer compound has a chain structure constituted of a polyacrylic acid and a crosslinked structure connecting carboxylic acid side chains (carboxyl groups) in the chain structure or between the chain structures. The crosslinked structure is a crosslinked structure represented in the following general formula (6):

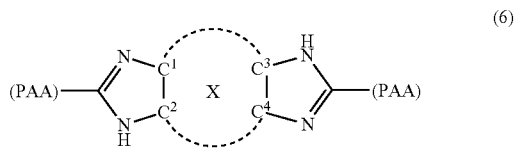

(6)

In the crosslinked structure represented by the general formula (6), PAA is a chain structure constituted of a polyacrylic acid, X is a ring structure having 1 to 3 benzene rings, and $C^1$ to $C^4$ are each a carbon atom constituting a benzene ring in the ring structure.

An example of the above-mentioned ring structure is a ring structure represented by the following the general formula (2):

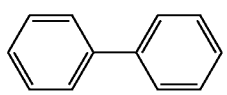
(2)

The ring structure represented by the general formula (2) is a polycyclic ring structure in which two benzene rings are linked. In the ring structure represented by the general formula (2), the benzene ring having $C^4$ and $C^2$ as components is preferably different from the benzene ring having $C^3$ and $C^4$ as components, although the positions of $C^4$ and $C^2$ and the positions of $C^3$ and $C^4$ in each benzene ring are not particularly limited. In addition, a substituent may be bonded to a carbon atom constituting each benzene ring, in addition to the four amino groups bonded to $C^4$ to $C^4$.

Specific examples of the crosslinked structure having a ring structure represented by the general formula (2) are shown below:

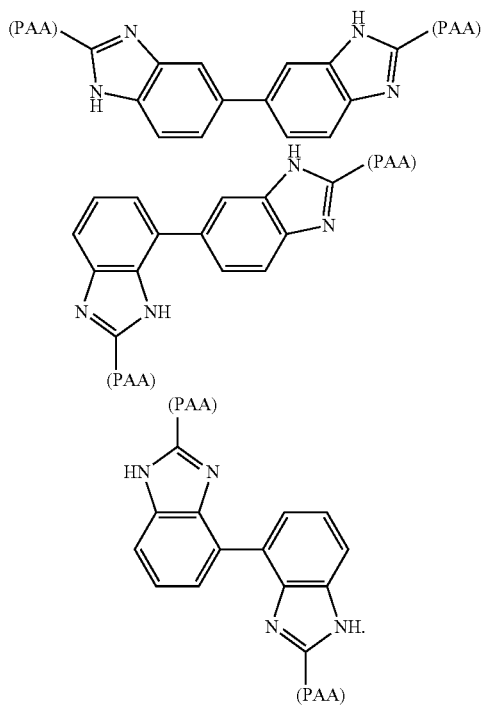

In addition, an example of the above-mentioned ring structure is represented by the following general formula (3):

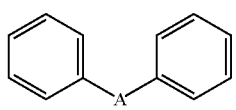
(3)

In the ring structure represented by the general formula (3), A is a methylene group or an oxygen atom.

The ring structure represented by the general formula (3) is a polycyclic ring structure in which two benzene rings are linked by a methylene group or an oxygen atom. In the ring structure represented by the general formula (3), the benzene ring having $C^4$ and $C^2$ as components is preferably different from the benzene ring having $C^3$ and $C^4$ as components, although the positions of $C^1$ and $C^2$ and the positions of $C^3$ and $C^4$ in each benzene ring are not particularly limited. In addition, a substituent may be bonded to a carbon atom constituting each benzene ring, in addition to the four amino groups bonded to $C^1$ to $C^4$.

Specific examples of the crosslinked structure having a ring structure represented by the general formula (3) are shown below:

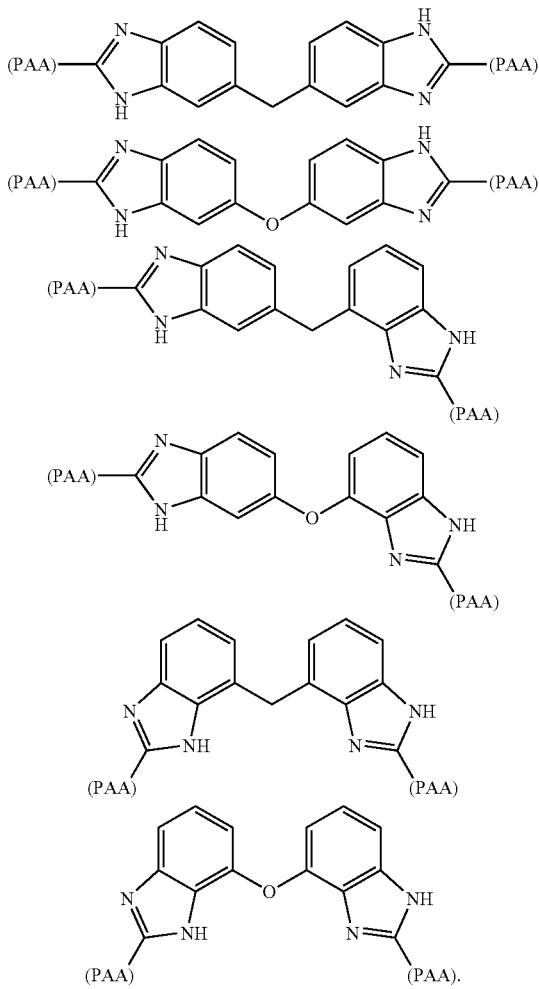

In addition, an example of the above-mentioned ring structure is represented by the following general formula (4):

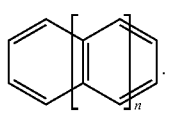
(4)

In the ring structure represented by the general formula (4), n is 0, 1, or 2.

The ring structure represented by the general formula (4) is a monocyclic ring structure (n=0) consisting of one benzene ring or a polycyclic ring structure (n=1 or 2) formed by condensation of two or three benzene rings. In the ring structure represented by the general formula (3), the positions of $C^1$ and $C^2$ and the positions of $C^3$ and $C^4$ in each benzene ring are not particularly limited. In addition, a substituent may be bonded to a carbon atom constituting each benzene ring, in addition to the four amino groups bonded to $C^1$ to $C^4$.

In addition, in the ring structure represented by the general formula (4), n is preferably 1 or 2. In this case, the benzene ring having $C^1$ and $C^2$ as components is preferably different from the benzene ring having $C^3$ and $C^4$ as components.

Specific examples of the crosslinked structure having a ring structure represented by the general formula (4) are shown below:

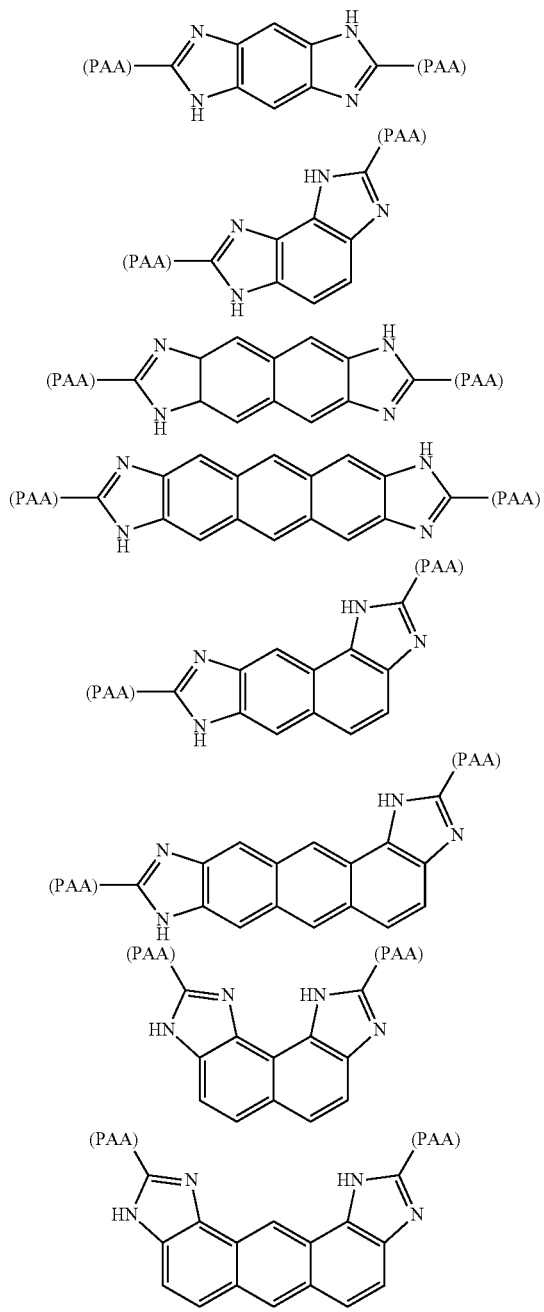

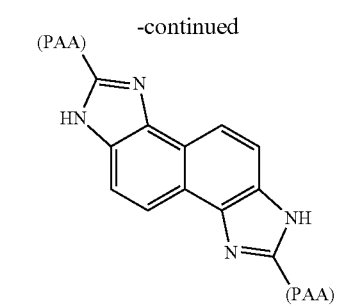

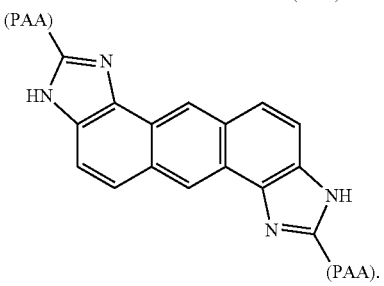

In addition, the polymer compound may have one or more types of the crosslinked structures represented by the general formula (6). The ring structure in the general formula (6) is equivalent to that in the general formula (1).

In the chain structure constituted of the polyacrylic acid, it is preferable that 10% to 100%, in terms of the number, of carboxyl groups form the crosslinked structure, and more preferable that 20% to 100%, in terms of the number, of carboxyl groups form the crosslinked structure.

[Negative electrode] Next, an example of a method for producing a negative electrode using the polymer compound as a binder for the negative electrode will be described.

First, a negative electrode active substance, a binder for a negative electrode, and a solvent are mixed to prepare a slurry. At this time, another component, such as a conductive assistant, may be further mixed as needed.

The negative electrode active substance may be a known substance used as a negative electrode active substance of a power storage device, such as a rechargeable battery, and examples thereof include carbon substances, elements that can be alloyed with lithium, and compounds containing elements that can be alloyed with lithium.

As the carbon substance, for example, a carbon substance that can occlude and release lithium can be used, and specific examples thereof include non-graphitizable carbon, natural graphite, artificial graphite, cokes, graphites, glassy carbons, organic polymer compound baked bodies, carbon fibers, activated carbon, and carbon blacks.

Examples of the element that can be alloyed with lithium include Na, K, Rb, Cs, Fr, Be, Mg, Ca, Sr, Ba, Ra, Ti, Ag, Zn, Cd, Al, Ga, In, Si, Ge, Sn, Pb, Sb, and Bi. Among these, Si is particularly preferred.

Examples of the compound containing an element that can be alloyed with lithium include compounds containing elements selected from Na, K, Rb, Cs, Fr, Be, Mg, Ca, Sr, Ba, Ra, Ti, Ag, Zn, Cd, Al, Ga, In, Si, Ge, Sn, Pb, Sb, and Bi. Among these, silicon-based materials, which are compounds containing Si, are particularly preferred.

Examples of the silicon-based material include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_V$ ($0<V\leq2$), $SnSiO_3$, and LiSiO. Among these, $SiO_V$ ($0<V\leq2$) is particularly preferred.

In addition, as the silicon-based material, a silicon material disclosed in International Publication No. 2014/080608, which is obtained from $CaSi_2$ through a decalcification reaction, also can be used. This silicon material is a silicon material obtained by, for example, decalcification (e.g., heat treatment at 300° C. to 1000° C.) of layered polysilane obtained by treatment of $CaSi_2$ with an acid (e.g., hydrochloric acid or hydrogen fluoride). The polymer compound of the present embodiment is particularly preferred to be used in combination with a silicon-based material, which is a negative electrode active substance having high degrees of expansion and contraction during charging and discharging. Furthermore, as the negative electrode active substance, the above-mentioned substances may be used singly or in combination of two or more thereof.

As the negative electrode binder mixed in the slurry, the above intermediate composition is used.

In addition, as the binder for a negative electrode, another binder for a negative electrode may be used together. Examples of such additional binder for a negative electrode include polyvinylidene fluoride, polytetrafluoroethylene, styrene-butadiene rubber, polyimide, polyamideimide, carboxymethyl cellulose, polyvinyl chloride, methacrylic resins, polyacrylonitrile, modified polyphenylene oxide, polyethylene oxide, polyethylene, polypropylene, polyacrylic acid, and phenolic resins.

One or two or more of these additional negative electrode binders may be used in combination. When the additional binder for a negative electrode is used in combination, the solid content of the intermediate composition, based on the total solid content of the binder for a negative electrode, is preferably 1 mass % or more and more preferably 10 mass % or more.

The blend proportion (negative electrode active substance:binder for a negative electrode) in the mass ratio of the negative electrode active substance to the binder for a negative electrode can be set according to the types of the negative electrode active substance and the binder for a negative electrode as necessary. The blend proportion is, for example, preferably within the range of 5:3 to 99:1, more preferably within the range of 3:1 to 97:3, and further preferably within the range of 16:3 to 95:5.

As the solvent, a known solvent that is used when an electrode of a power storage device, such as a rechargeable battery, is produced can be used according to the types of the negative electrode active substance and the binder for a negative electrode as necessary. Specific examples of the solvent include N-methyl-2-pyrrolidone, methanol, and methyl isobutyl ketone.

As the conductive assistant, a known conductive assistant used in the negative electrode of a power storage device, such as a rechargeable battery, can be used. Specific examples of the conductive assistant include acetylene black, carbon nanotubes, and Ketjen black. These conductive assistants may be used singly or in combination of two or more thereof.

When a conductive assistant is contained in the slurry, a dispersant is preferably contained together with the conductive assistant. Specific examples of the dispersant include polyvinyl pyrrolidone, polyvinyl alcohol, polyvinyl butyral, and triazine compounds. These dispersants may be used singly or in combination of two or more thereof.

The slurry is then applied to a current collector to form a negative electrode active substance layer made of the slurry on the surface of the current collector. Subsequently, the solvents (the solvent of the slurry and the solvent contained in the intermediate composition) contained in the negative electrode active substance layer are removed to dry the negative electrode active substance layer, and the negative electrode active substance layer is cured by heat treatment. The heat treatment causes condensation of the polyacrylic acid (A) and the polyfunctional amine (B) contained in the intermediate composition to form the polymer compound in the negative electrode active substance layer. Although the heat treatment may be performed in a state in which the negative electrode active substance layer contains a solvent, it is more preferred to perform drying treatment in advance and perform the heat treatment in a state in which the negative electrode active substance layer is dried.

Specific methods of the drying treatment and the heat treatment include a method of performing heating with a heat source, such as hot air, infrared rays, microwaves, and high frequencies, under atmospheric pressure or reduced pressure. In the heat treatment, heating from the current collector side is preferred to heating from the negative electrode active substance layer side. In addition, in the drying treatment, slow heating at low temperature is preferred to quick heating at high temperature. In the heat treatment, quick heating at high temperature is preferred to slow heating at low temperature. Such a heating procedure can enhance the battery characteristics (initial efficiency and cycle property) of a power storage device.

As the current collector, a known metal material used as the current collector for the negative electrode of a power storage device, such as a rechargeable battery, can be used. Examples of the metal material that can be used as the current collector include silver, copper, gold, aluminum, magnesium, tungsten, cobalt, zinc, nickel, iron, platinum, tin, indium, titanium, ruthenium, tantalum, molybdenum, and stainless steel.

A negative electrode using the polymer compound of the present embodiment as the binder for the negative electrode can be suitably used in a nonaqueous power storage device including a nonaqueous electrolyte as the electrolyte. Examples of the power storage device include a rechargeable battery, an electric double-layer capacitor, and a lithium ion capacitor. In addition, these power storage devices are useful as nonaqueous rechargeable batteries for driving motors of electric vehicles and hybrid cars or as nonaqueous rechargeable batteries utilized in personal computers, portable communication devices, home appliances, office devices, industrial devices, and so on.

Next, the advantages of the present embodiment will be described.

(1) The polymer compound of the present embodiment is a compound formed by condensation of a polyacrylic acid and a polyfunctional amine represented by the general formula (1). In addition, the polymer compound of the present embodiment has a chain structure constituted of a polyacrylic acid and a crosslinked structure connecting carboxylic acid side chains in the chain structure or between the chain structures. The crosslinked structure is a crosslinked structure represented in the general formula (6).

The polymer compound having the above constitution is useful as a binder for a negative electrode of a power storage device in the viewpoint of the cycle property and initial efficiency of the power storage device and adhesion of the negative electrode active substance layer.

(2) The blend proportion of the polyfunctional amine represented by the general formula (1) is such that the molar ratio of the polyfunctional amine to the carboxyl group possessed by the polyacrylic acid (A) is 1/10 to 1/1. In addition, in the chain structure constituted of a polyacrylic acid, 20% to 100% of the total number of carboxyl groups form the crosslinked structure represented by the general formula (6).

According to the above constitution, when the polymer compound is used as a binder for a negative electrode, an effect of improving the cycle property of the power storage device is easily achieved.

The above embodiment can also be embodied by being modified as follows.

The polymer compound may be a polymer compound having a second crosslinked structure in addition to the first crosslinked structure represented by the general formula (6).

For example, the polymer compound may be a polymer compound formed by condensation of the polyacrylic acid (A), the polyfunctional amine (B) (polyfunctional amine represented by the general formula (1)), and an additional polyfunctional amine (C). In this case, the polymer compound further has the second crosslinked structure derived from the additional polyfunctional amine (C) in addition to the first crosslinked structure derived from the polyfunctional amine (B) (crosslinked structure represented by the general formula (6)). The physical properties, such as strength and flexibility, of the polymer compound can be adjusted by adding the second crosslinked structure.

Examples of the additional polyfunctional amine include polyfunctional amines represented by the following general formula (5):

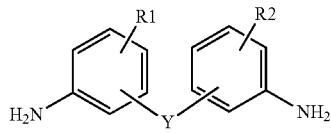
(5)

In the general formula (5), Y is a linear alkyl group having 1 to 4 carbon atoms, a phenylene group, or an oxygen atom, and the bonding position of Y in each benzene ring may be any of the ortho, meta, and para positions with respect to the amino group.

When Y is a linear alkyl group or a phenylene group, a substituent may be bonded to a carbon atom constituting the structure. Examples of the substituent bonded to a carbon atom constituting the linear alkyl group include a methyl group, an ethyl group, a fluoromethyl group, a difluoromethyl group, a trifluoromethyl group, a methoxy group, an ethoxy group, and an oxo group. Only one or two or more of these substituents may be bonded. The number of substituents bonded to one carbon atom may be one or two. The substituent bonded to a carbon atom constituting the linear alkyl group or the phenylene group may be an amino group or a substituent containing an amino group. In this case, the additional polyfunctional amine is a polyfunctional amine having three or more amino groups.

In the general formula (5), R1 and R2 are each independently one or more hydrogen atoms, methyl groups, ethyl groups, trifluoromethyl groups, or methoxy groups. When R1 is a methyl group, an ethyl group, a trifluoromethyl group, or a methoxy group, the bonding position of R1 may be any of the ortho, meta, and para positions with respect to the amino group. The same applies to R2.

Specific examples of the polyfunctional amine represented by the general formula (5) will be described.

Examples of the polyfunctional amine in which Y is a linear alkyl group include 3,3'-diaminodiphenylmethane, 4,4'-diaminodiphenylmethane, 3,4'-diaminodiphenylmethane, 4,4'-ethylenedianiline, 4,4'-diamino-3,3'-dimethyldiphenylmethane, 1,1-bis(4-aminophenyl)cyclohexane, 9,9-bis(4-aminophenyl)fluorene, 2,2'-bis(4-aminophenyl) hexafluoropropane, 4,4'-diaminobenzophenone, 4,4'-methylenebis(2-ethyl-6-methylaniline), and pararosaniline.

Examples of the polyfunctional amine in which Y is a phenylene group include 1,3,5-tris(4-aminophenyl)benzene. Examples of the polyfunctional amine in which Y is an oxygen atom include 4,4'-diaminodiphenyl ether. 1,3,5-Tris (4-aminophenyl)benzene and pararosaniline are each a trifunctional amine having three amino groups. As the additional polyfunctional amine (C), the above polyfunctional amines may be used singly or in combination of two or more thereof.

The crosslinked structure derived from the polyfunctional amine represented by the general formula (5) is at least one crosslinked structure selected from the following general formulae (7) to (9) each having at least one of an amide bond and an imide bond formed between the carboxyl group of the polyacrylic acid (A) and the amino group of the polyfunctional amine represented by the general formula (5).

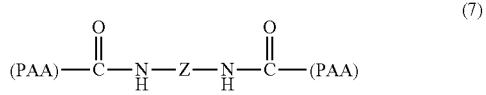
(7)

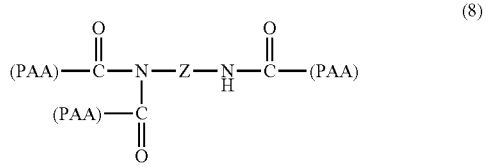
(8)

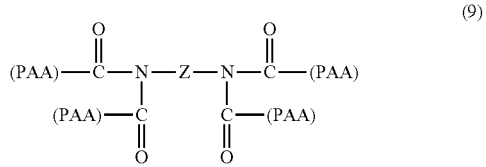
(9)

In the general formulae (7) to (9), PAA represents a chain structure constituted of a polyacrylic acid, and Z is a crosslinked structure represented by the following general formula (10). In the general formulae (8) to (9) having imide structures, the two carbonyl groups constituting one imide structure may be bonded to different respective chain structures or may be bonded to the same chain structure. For example, when two carbonyl groups constituting an imide structure are bonded to carbon atoms adjacent to each other in one chain structure, a maleimide structure is formed as the imide structure.

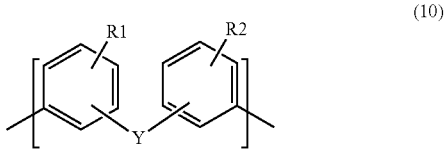
(10)

In the general formula (10), Y is a linear alkyl group having 1 to 4 carbon atoms, a phenylene group, or an oxygen atom, and the bonding position of Y in each benzene ring may be any of the ortho, meta, and para positions with respect to the amino group. The structure of Y in the general formula (10) is equivalent to that of Y in the general formula (5).

In the general formula (10), R1 and R2 are each independently one or more hydrogen atoms, methyl groups, ethyl groups, trifluoromethyl groups, or methoxy groups. When R1 is a methyl group, a trifluoromethyl group, or a methoxy group, the bonding position of R1 may be any of the ortho, meta, and para positions with respect to the amino group. The same applies to R2. The structures of R1 and R2 in the general formula (10) are equivalent to those of R1 and R2 in the general formula (5).

In the case of using, as the binder for a negative electrode, a polymer compound having a first crosslinked structure represented by the general formula (6) and a second crosslinked structure that is at least one selected from the general formulae (7) to (9), the adhesion of the negative electrode active substance layer is improved.

The blend proportion of the additional polyfunctional amine (C) is preferably 0.1 to 1.5 moles per one mole of the polyfunctional amine (B) (polyfunctional amine represented by the general formula (1)). In addition, in the polymer compound, the ratio of the second crosslinked structure to the first crosslinked structure is preferably 0.1 to 1.5.

The polymer compound may include a carboxyl group to which an aromatic monoamine is bonded in the chain structure portion.

For example, the polymer compound may be that formed by condensation of the polyacrylic acid (A), the polyfunctional amine (B), and an aromatic monoamine (D). The presence of a carboxyl group to which an aromatic monoamine is bonded can adjust the physical properties, such as strength and flexibility, of the polymer compound.

The aromatic monoamine (D) is an aromatic compound in which an amino group being a weak base is bonded to an aromatic compound having an aromatic ring structure and includes only one amino group capable of condensing with a carboxyl group of the polyacrylic acid (A).

Examples of the aromatic ring structure include a 4- to 8-membered monocyclic structure and a polycyclic ring structure composed of multiple (e.g., two or three) 4- to 8-membered rings in combination. The aromatic ring structure may be a cyclic structure consisting of carbon or may be a heterocyclic structure containing an element other than carbon. In addition, the aromatic monoamine (D) may be a primary amine or a secondary amine.

Specific examples of the aromatic monoamine (D) include aniline, naphthylamine, aminoanthracene, aminopyrene, aminophenol, fluoroaniline, chloroaniline, bromoaniline, iodoaniline, toluidine, aminotriphenylamine, difluoroaniline, dichloroaniline, dibromoaniline, diiodoaniline, dimethylaniline, trifluoroaniline, trichloroaniline, tribromoaniline, triiodoaniline, trimethylaniline, N,N-dimethyl-1,4-phenylenediamine, N,N-dimethyl-4,4'-diaminodiphenylmethane, anisidine, aminobenzenethiol, and aminobenzonitrile. These aromatic monoamines may be used singly or in combination of two or more thereof.

The blend proportion of the aromatic monoamine (D) is preferably 0.1 to 1.0 moles per one mole of the polyfunctional amine (B) (polyfunctional amine represented by the general formula (1)). Within the above ratio, the physical properties, such as strength and flexibility, of the polymer compound do not greatly change, and thus the polymer compound is suppressed from becoming unsuitable as a binder for a negative electrode.

EXAMPLES

Examples further embodying the above embodiment will now be described.
<Test 1>

A polymer compound formed by condensation of a polyacrylic acid and a polyfunctional amine represented by the general formula (1) was used as a binder for a negative electrode, and the battery characteristics and the adhesion of the negative electrode active substance layer were evaluated. In addition, as a comparative subject, a polymer compound formed by condensation of a PAA and a polyfunctional amine represented by the general formula (5) or a polyacrylic acid was used as a binder for a negative electrode, and the battery characteristics and the peeling strength of the negative electrode active substance layer were evaluated.

Hereinafter, polyacrylic acid is referred to as "PAA", and N-methyl-2-pyrrolidone is referred to as "NMP".

Example 1: PAA+3,3'-diaminobenzidine

A PAA having a weight-average molecular weight of 130,000 was dissolved in NMP to prepare a 15 mass % PAA/NMP solution, and 3.31 g of this PAA/NMP solution (6.9 mmol in monomer equivalent of PAA) was put in a flask under a nitrogen atmosphere. Into the flask, 0.8 g of a 50 mass % NMP solution of 3,3'-diaminobenzidine (1.87 mmol) was added, followed by stirring at room temperature for 30 minutes. Subsequently, heat treatment (preheat treatment) was performed at 110° C. for 2 hours to obtain an intermediate composition of Example 1 in the form of an NMP solution.

Reference Example 1:
PAA+4,4'-diaminodiphenylmethane

A PAA having a weight-average molecular weight of 130,000 was dissolved in NMP to prepare a 15 mass % PAA/NMP solution, and 3.31 g of this PAA/NMP solution (6.9 mmol in monomer equivalent of PAA) was put in a flask under a nitrogen atmosphere. Into the flask, 0.74 g of a 50 mass % NMP solution of 4,4'-diaminodiphenylmethane (1.87 mmol) was added, followed by stirring at room temperature for 30 minutes. Subsequently, heat treatment (preheat treatment) was performed at 110° C. for 2 hours to obtain an intermediate composition of Reference Example 1 in the form of an NMP solution.

Production of Silicon Material 5 grams of $CaSi_2$ was added to 20 ml of concentrated hydrochloric acid containing hydrogen fluoride ice-bathed at 0° C. in a concentration of 1 mass %, followed by stirring for 1 hour, and water was then added thereto, followed by further stirring for 5 minutes. The reaction solution was filtrated, and the resulting yellow powder was washed with water and ethanol and was dried under reduced pressure to obtain a layered polysilane. The resulting layered polysilane was heated under an argon atmosphere at 800° C. to obtain a silicon material in which hydrogen was desorbed from the polysilane.

Production of Electrode Sheet

A slurry was prepared by mixing 77 parts by mass of the silicon material, 13 parts by mass of acetylene black, and 10 parts by mass of an NMP solution of the intermediate composition of Example 1 and by adding NMP to the mixture. The slurry was applied to the surface of 30 μm electrolytic copper foil as a current collector by a doctor blade method into a film form. The NMP in the slurry was then removed by volatilization to form a negative electrode active substance layer on the electrolytic copper foil. Subsequently, the electrolytic copper foil and the negative electrode active substance layer were compressed with a roll press machine such that the thickness of the negative electrode active substance layer was reduced to 20 μm to tightly adhere and bond between the electrolytic copper foil and the negative electrode active substance layer. Subsequently, heat treatment was performed in vacuum (under reduced pressure) at 200° C. for 30 minutes for a condensation reaction of the intermediate composition contained in the negative electrode active substance layer and for thermal curing of the negative electrode active substance layer. Consequently, an electrode sheet containing a polymer compound having a crosslinked structure as a binder for a negative electrode was obtained.

In addition, similar electrode sheets were produced by using an NMP solution of the intermediate composition of Reference Example 1 or a PAA, instead of the NMP solution of the intermediate composition of Example 1.

Production of Lithium Ion Rechargeable Battery

A separator was disposed between a negative electrode (electrode for evaluation) prepared by cutting the electrode sheet into a circle with a diameter of 11 mm and a positive electrode prepared by cutting metal lithium foil having a thickness of 500 μm into a circle with a diameter of 13 mm to form an electrode body battery. The electrode body battery was accommodated in a battery case, and a nonaqueous electrolyte was poured into the battery case. The battery case was sealed to obtain a lithium ion rechargeable battery. As the separator, a glass filter manufactured by Hoechst Celanese and Celgard 2400 manufactured by Celgard, LLC were used. The nonaqueous electrolyte used was prepared by dissolving lithium hexafluorophosphate in a solvent mixture of ethylene carbonate and diethyl carbonate at a volume ratio of 1:1 so as to give a concentration of 1 M.

Evaluation of Battery Characteristics

The resulting lithium ion rechargeable battery was discharged at a direct current of 0.2 mA until the voltage of the negative electrode with respect to the positive electrode reached 0.01 V, and 10 minutes after the completion of the discharge, charging was performed at a direct current of 0.2 mA until the voltage of the negative electrode with respect to the positive electrode reached 1.0 V. The discharge capacity at this time was defined as the initial discharge capacity, and the charge capacity was defined as the initial charge capacity. The initial efficiency was then calculated based on the following expression. The results are shown in Table 1.

Initial efficiency(%)=(initial charge capacity/initial discharge capacity)×100

In addition, a cycle consisting of the above-described discharging and charging was repeated predetermined times, and the cycle property was calculated based on the following expression. The results are shown in Table 1.

Cycle property(%)=(charge capacity after predetermined cycles/initial charge capacity)×100

Evaluation of Adhesion of Negative Electrode Active Substance Layer

The resulting electrode sheet was cut into 2.5 cm×4 cm to form a measurement sample, and a 90-degree peeling test according to JIS K 6854-1 was carried out using a peeling test apparatus (manufactured by MinebeaMitsumi Inc., LTS-50N-S300). The peeling strength of the measurement sample was calculated by dividing the strength measured by the 90-degree peeling test by the line width (2.5 cm). The results are shown in Table 1.

TABLE 1

| | Test Example | | |
|---|---|---|---|
| | 1 | 2 | 3 |
| Binder for negative electrode | Example 1 | Reference Example 1 | PAA |
| Initial discharge capacity (mAh/g) | 1700 | 1720 | 1705 |
| Initial efficiency (%) | 81.7 | 81.1 | 81.8 |
| Cycle property (%) 50 cycles | 82 | 81 | 21 |
| Peeling strength (N/cm) | 0.18 | 0.13 | 0.19 |

As shown in Table 1, in Test Example 1 using, as the binder for a negative electrode, a polymer compound having a crosslinked structure derived from a polyfunctional amine represented by the general formula (1) and in Test Example 2 using, as the binder for a negative electrode, a polymer compound having a crosslinked structure derived from a polyfunctional amine represented by the general formula (5), the results showed higher cycle properties, compared with Test Example 3 using a PAA as the binder for a negative electrode. This result reveals that the cycle property is improved by using, as a binder for a negative electrode, a polymer compound having a chain structure consisting of a PAA and a crosslinked structure including a ring structure containing a benzene ring.

In addition, in Test Example 1 using, as the binder for a negative electrode, a polymer compound having a crosslinked structure derived from a polyfunctional amine represented by the general formula (1), the results showed higher initial efficiency and peeling strength, compared with Test Example 2 using, as the binder for a negative electrode, a polymer compound having a crosslinked structure derived from a polyfunctional amine represented by the general formula (5). This result is conceived to be caused by the difference between the crosslinked structures possessed by the polymer compounds.

That is, the crosslinked structure possessed by the polymer compound used in Test Example 2 is derived from the polyfunctional amine represented by the general formula (5) and is a crosslinked structure represented by any of the general formulae (7) to (9). This crosslinked structure is prepared by formation of an amide bond or an imide bond between the carboxyl group of the PAA and the amino group of the polyfunctional amine represented by the general formula (5). Accordingly, it is conceived that an irreversible reaction readily occurs between the carbonyl oxygen of the carbonyl group in the amide bond or the imide bond possessed by the crosslinked structure and lithium and that this irreversible reaction lowers the amount of lithium moving between electrodes, resulting in a reduction in the initial efficiency.

In contrast, the crosslinked structure possessed by the polymer compound used in Test Example 1 is derived from a polyfunctional amine represented by the general formula (1) and is a crosslinked structure represented by the general formula (6). This crosslinked structure is prepared by formation of a benzimidazole-like bonding structure by the carboxyl group of the PAA and two amino groups of the polyfunctional amine represented by the general formula (1). In this crosslinked structure, the carbonyl structure of the carboxyl group is converted into an imine structure, and the carbonyl oxygen is desorbed from the crosslinked structure. Accordingly, it is conceived that an irreversible reaction does not occur between the carbonyl oxygen and lithium in the crosslinked structure portion, unlike the crosslinked structure having an amide bond or an imide bond, and that the initial efficiency hardly decreases. In addition, the benzimidazole-like bonding structure forms a rigid crosslinked structure and therefore improves the resin strength of the polymer compound. It is conceived that as a result, the peeling strength of the negative electrode active substance layer is increased.

These results reveal that the polymer compound having a crosslinked structure derived from a polyfunctional amine represented by the general formula (1) is useful as a binder for a negative electrode, from the viewpoint of battery characteristics (cycle property and initial efficiency) and adhesion (peeling strength) of the negative electrode active substance layer.

<Test 2>

Next, a polymer compound formed by condensation of a PAA and a polyfunctional amine represented by the general formula (1) was used as a binder for a negative electrode, and a change in the battery characteristics when the blend proportion of the polyfunctional amine was changed was evaluated.

Examples 1-1 to 1-5: PAA+3,3'-diaminobenzidine

A PAA having a weight-average molecular weight of 130,000 was dissolved in NMP to prepare a 15 mass % PAA/NMP solution, and 3.31 g of this PAA/NMP solution (6.9 mmol in monomer equivalent of PAA) was put in a flask under a nitrogen atmosphere. Into the flask, a prescribed amount of a 50 mass % NMP solution of 3,3'-diaminobenzidine (0.35 to 6.9 mmol) was added, followed by stirring at room temperature for 30 minutes. Subsequently, heat treatment (preheat treatment) was performed at 110° C. for 2 hours to obtain each intermediate composition of Examples 1-1 to 1-5 in the form of an NMP solution. The blend amount of the 3,3'-diaminobenzidine and the blend proportion of the PAA and 3,3'-diaminobenzidine in each Example are as shown in Table 2.

Evaluation of Battery Characteristics

An electrode sheet containing, as the binder for a negative electrode, a polymer compound prepared from an intermediate composition was produced using the intermediate composition of each Example. A lithium ion rechargeable battery was produced using the resulting electrode sheet, and the battery characteristics of the lithium ion rechargeable battery were evaluated. The results are shown in Table 2. The method for producing the electrode sheet, the method for forming the lithium ion rechargeable battery, and the method for evaluating the battery characteristics of the lithium ion rechargeable battery are the same as those in Test 1.

TABLE 2

|  | Test example | | | | |
|---|---|---|---|---|---|
|  | 4 | 5 | 6 | 7 | 8 |
| Binder for negative electrode | Example 1-1 | Example 1-2 | Example 1-3 | Example 1-4 | Example 1-5 |
| PAA (mmol) | 6.9 | 6.9 | 6.9 | 6.9 | 6.9 |
| Polyfunctional amine (mmol) | 0.35 | 0.86 | 1.87 | 3.45 | 6.9 |

TABLE 2-continued

|  | Test example | | | | |
|---|---|---|---|---|---|
|  | 4 | 5 | 6 | 7 | 8 |
| Blend proportion (Polyfunctional amine/PAA) | 1/20 | 1/8 | 1/3.7 | 1/2 | 1/1 |
| Initial discharge capacity (mAh/g) | 1753 | 1704 | 1700 | 1708 | 1696 |
| Initial efficiency (%) | 81.8 | 81.6 | 81.7 | 81.6 | 81.2 |
| Cycle property (%) 50 cycles | 37 | 82 | 82 | 83 | 59 |

As shown in Table 2, it was demonstrated that the cycle property tends to change according to the blend proportion of the polyfunctional amine represented by the general formula (1). In particular, when the blend proportion of the polyfunctional amine represented by the general formula (1) was within the range of 1/10 to 1/1, the cycle property was 50% or more. When the blend proportion was within the range of 1/10 to 1/2, the cycle property was 80% or more. This result reveals that the presence of a crosslinked structure derived from a polyfunctional amine represented by the general formula (1) provides an effect of improving the cycle property.

In Test Example 8, the blend proportion of the polyfunctional amine represented by the general formula (1) exceeds the theoretical blend proportion (1/2) at which a crosslinked structure derived from a polyfunctional amine is formed for all the carboxyl groups possessed by the PAA. In this case, although polyfunctional amines each in which a pair of amino groups on only one side is bonded to the carboxyl group of a PAA remain, the PAA is in a state in which all the carboxyl groups of the PAA are bonded to the polyfunctional amine, resulting in a reduction in the number of the crosslinked structures formed by the PAA. As a result, it is conceived that the effect of improving the cycle property is low.

<Test 3>

Next, a polymer compound formed by condensation of a PAA, a polyfunctional amine represented by the general formula (1), and a polyfunctional amine represented by the general formula (5) or an aromatic monoamine was used as a binder for a negative electrode, and the battery characteristics and the adhesion of the negative electrode active substance layer were evaluated.

Example 2: PAA+3,3'-diaminobenzidine+4,4'-diaminodiphenylmethane

A PAA having a weight-average molecular weight of 130,000 was dissolved in NMP to prepare a 15 mass % PAA/NMP solution, and 3.31 g of this PAA/NMP solution (6.9 mmol in monomer equivalent of PAA) was put in a flask under a nitrogen atmosphere. Into the flask, 0.4 g of a 50 mass % NMP solution of 3,3'-diaminobenzidine (0.93 mmol) and 0.384 g of a 50 mass % NMP solution of 4,4'-diaminodiphenylmethane (0.93 mmol) were added, followed by stirring at room temperature for 30 minutes. Subsequently, heat treatment (preheat treatment) was performed at 110° C. for 2 hours to obtain an intermediate composition of Example 2 in the form of an NMP solution.

Example 3: PAA+3,3'-diaminobenzidine+3,3'-diaminodiphenylmethane

A PAA having a weight-average molecular weight of 130,000 was dissolved in NMP to prepare a 15 mass %

PAA/NMP solution, and 3.31 g of this PAA/NMP solution (6.9 mmol in monomer equivalent of PAA) was put in a flask under a nitrogen atmosphere. Into the flask, 0.4 g of a 50 mass % NMP solution of 3,3'-diaminobenzidine (0.93 mmol) and 0.384 g of a 50 mass % NMP solution of 3,3'-diaminodiphenylmethane (0.93 mmol) were added, followed by stirring at room temperature for 30 minutes. Subsequently, heat treatment (preheat treatment) was performed at 110° C. for 2 hours to obtain an intermediate composition of Example 3 in the form of an NMP solution.

Example 4: PAA+3,3'-diaminobenzidine+4,4'-diaminodiphenyl ether

A PAA having a weight-average molecular weight of 130,000 was dissolved in NMP to prepare a 15 mass % PAA/NMP solution, and 3.31 g of this PAA/NMP solution (6.9 mmol in monomer equivalent of PAA) was put in a flask under a nitrogen atmosphere. Into the flask, 0.4 g of a 50 mass % NMP solution of 3,3'-diaminobenzidine (0.93 mmol) and 0.392 g of a 50 mass % NMP solution of 4,4'-diaminodiphenyl ether (0.93 mmol) were added, followed by stirring at room temperature for 30 minutes. Subsequently, heat treatment (preheat treatment) was performed at 110° C. for 2 hours to obtain an intermediate composition of Example 4 in the form of an NMP solution.

Example 5: PAA+3,3'-diaminobenzidine+aniline

A PAA having a weight-average molecular weight of 130,000 was dissolved in NMP to prepare a 15 mass % PAA/NMP solution, and 3.31 g of this PAA/NMP solution (6.9 mmol in monomer equivalent of PAA) was put in a flask under a nitrogen atmosphere. Into the flask, 0.8 g of a 50 mass % NMP solution of 3,3'-diaminobenzidine (1.87 mmol) and 0.173 g of a 50 mass % NMP solution of aniline (0.93 mmol) were added, followed by stirring at room temperature for 30 minutes. Subsequently, heat treatment (preheat treatment) was performed at 110° C. for 2 hours to obtain an intermediate composition of Example 5 in the form of an NMP solution.

Evaluation of Battery Characteristics and Adhesion of Negative Electrode Active Substance Layer An electrode sheet containing, as the binder for a negative electrode, a polymer compound prepared from an intermediate composition was produced using the intermediate composition of each of Examples 2 to 5. A lithium ion rechargeable battery was produced using the resulting electrode sheet, and the battery characteristics of the lithium ion rechargeable battery and the adhesion of the negative electrode active substance layer were evaluated. The results are shown in Table 3. The method for producing the electrode sheet, the method for forming the lithium ion rechargeable battery, the method for evaluating the battery characteristics of the lithium ion rechargeable battery, and the method for evaluating the adhesion of the negative electrode active substance layer are the same as those in Test 1.

In Table 3, "○" in the column "First crosslinked structure" indicates that the binder for a negative electrode is a polymer compound having a crosslinked structure derived from a polyfunctional amine represented by the general formula (1). "○" in the column "Second crosslinked structure" indicates that the binder for a negative electrode is a polymer compound having a crosslinked structure derived from a polyfunctional amine represented by the general formula (5). "○" in the column "Monoamine addition structure" indicates that the binder for a negative electrode is a polymer compound including a carboxyl group to which an aromatic monoamine is bonded.

TABLE 3

| | Test example | | | | |
|---|---|---|---|---|---|
| | 9 | 10 | 11 | 12 | 1 |
| Binder for negative electrode | Example 2 | Example 3 | Example 4 | Example 5 | Example 1 |
| First crosslinked structure | ○ | ○ | ○ | ○ | ○ |
| Second crosslinked structure | ○ | ○ | ○ | — | — |
| Monoamine addition structure | — | — | — | ○ | — |
| Initial discharge capacity (mAh/g) | 1720 | 1711 | 1716 | 1698 | 1700 |
| Initial efficiency (%) | 81.8 | 81.7 | 81.7 | 81.8 | 81.7 |
| Cycle property (%) 50 cycles | 84 | 85 | 82 | 81 | 82 |
| Peeling strength (N/cm) | 0.22 | 0.21 | 0.22 | 0.17 | 0.18 |

As shown in Table 3, in Test Examples 9 to 11 using a polymer compound having the first crosslinked structure and the second crosslinked structure as the binder for a negative electrode, the results showed higher peeling strength, compared with Test Example 1 using a polymer compound having only the first crosslinked structure as the binder for a negative electrode. In addition, in Test Examples 9 to 11, it was demonstrated that the cycle property also tends to be higher.

In addition, in Test Example 12 using, as the binder for a negative electrode, a polymer compound including a carboxyl group to which an aromatic monoamine is bonded, the results in all evaluations were the same levels as those in Test Example 1 using a polymer compound having only the first crosslinked structure as the binder for a negative electrode. This result reveals that the presence of a carboxyl group to which an aromatic monoamine is bonded does not inhibit the effect provided by the crosslinked structure (first crosslinked structure) derived from a polyfunctional amine represented by the general formula (1).

The invention claimed is:
1. A negative electrode for a power storage device, comprising:
  a current collector made of a metal material; and
  a negative electrode active substance layer bonded onto the current collector, wherein
  the negative electrode active substance layer contains a negative electrode binder for bonding the negative electrode active substance to the current collector, and
  a polymer compound to be used as the negative electrode binder
  a polymer compound to be used as the negative electrode binder comprises a chain structure constituted of a polyacrylic acid and a crosslinked structure connecting carboxylic acid side chains in the chain structure or between the chain structures, and
  the crosslinked structure is a crosslinked structure represented in the following general formula (6), where PAA is a chain structure constituted of a polyacrylic acid, X is a ring structure having 1 to 3 benzene rings, and $C^1$ to $C^4$ are each a carbon atom constituting a benzene ring in the ring structure

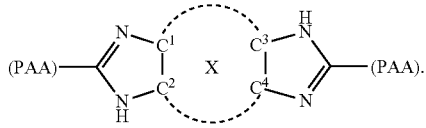
(5)
(6)

2. The negative electrode according to claim 1, wherein the ring structure is at least one ring structure selected from the following general formulae (2) to (4), where A is a methylene group or an oxygen atom, and n is 0, 1, or 2

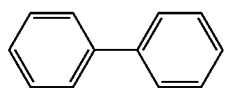
(2)

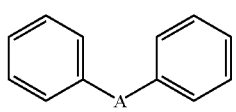
(3)

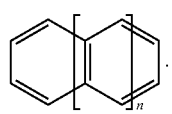
(4)

3. The negative electrode according to claim 1, wherein
the crosslinked structure has a first crosslinked structure represented by the general formula (6) and a second crosslinked structure, which is at least one selected from crosslinked structures represented by the following general formulae (7) to (9), and PAA is a chain structure constituted of a polyacrylic acid, and Z is a structure represented by the following general formula (10), where Y is a linear alkyl group having 1 to 4 carbon atoms, a phenylene group, or an oxygen atom, and R1 and R2 are each independently a hydrogen atom, a methyl group, a trifluoromethyl group, or a methoxy group

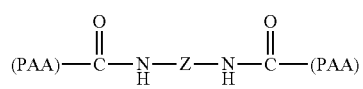
(7)

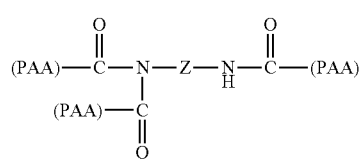
(8)

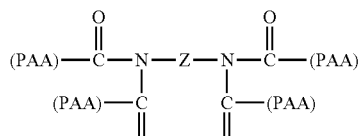
(9)

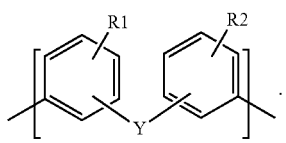
(10)

4. An intermediate composition of a polymer compound to be used as a binder for a negative electrode of a power storage device, the intermediate composition comprising:
a polyacrylic acid, a solvent, and a polyfunctional amine represented by the following general formula (1), where X is a ring structure having 1 to 3 benzene rings, and $C^1$ to $C^4$ are each a carbon atom constituting a benzene ring in the ring structure

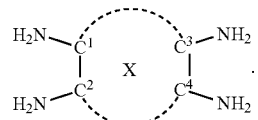
(1)

5. A method for producing the negative electrode according to any one of claim 1, the method comprising:
condensing a polyacrylic acid and a polyfunctional amine represented by the following general formula (1) to form the polymer compound in the negative electrode active substance layer, where X is a ring structure having 1 to 3 benzene rings, and C' to $C^4$ are each a carbon atom constituting a benzene ring in the ring structure

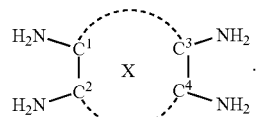
(1)

6. A negative electrode according to claim 1, wherein the negative electrode active substance is at least one selected from a carbon substance capable of occluding and releasing lithium, an element that can be alloyed with lithium, and a compound containing an element that can be alloyed with lithium.

7. The negative electrode according to claim 6, wherein the negative electrode active substance is at least one selected from a silicon material obtained from $CaSi_2$ through a decalcification reaction, Si, and $SiO_v$ (0<V≤2).

8. A power storage device comprising the negative electrode according to claim 6 and a nonaqueous electrolyte.

* * * * *